United States Patent
Huang et al.

(10) Patent No.: US 7,423,358 B2
(45) Date of Patent: Sep. 9, 2008

(54) STATOR STRUCTURE AND MANUFACTURING METHOD THEREOF

(75) Inventors: Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/889,005

(22) Filed: Jul. 13, 2004

(65) Prior Publication Data

US 2005/0046287 A1 Mar. 3, 2005

(30) Foreign Application Priority Data

Aug. 26, 2003 (TW) ............... 92123387 A

(51) Int. Cl.
    *H02K 1/24* (2006.01)
(52) U.S. Cl. ................... 310/216; 310/254
(58) Field of Classification Search ........... 310/216, 310/218, 254, 257, 58, 60 A, 162, 164, 44, 310/43, 45, 217
See application file for complete search history.

(56) References Cited

U.S. PATENT DOCUMENTS

| | | | |
|---|---|---|---|
| 3,459,982 A * | 8/1969 | Cartier | 310/164 |
| 4,149,309 A * | 4/1979 | Mitsui | 29/596 |
| 4,775,813 A * | 10/1988 | Janson | 310/257 |
| 4,891,567 A * | 1/1990 | Fujitani et al. | 318/254 |
| 5,331,237 A * | 7/1994 | Ichimura | 310/44 |
| 5,382,859 A * | 1/1995 | Huang et al. | 310/216 |
| 5,853,513 A | 12/1998 | Kelsic | |
| 5,859,487 A | 1/1999 | Chen | |
| 6,157,102 A * | 12/2000 | Suzuki et al. | 310/44 |
| 6,419,877 B1 * | 7/2002 | Elgelid et al. | 419/35 |
| 6,853,101 B2 * | 2/2005 | Lin et al. | 310/49 R |
| 6,940,388 B2 * | 9/2005 | Moro | 336/233 |
| 2003/0193260 A1 * | 10/2003 | Reiter et al. | 310/217 |

FOREIGN PATENT DOCUMENTS

| | | | | |
|---|---|---|---|---|
| JP | 60187244 A | * | 9/1985 | |
| JP | 6112004 A | * | 1/1986 | 310/218 |
| JP | 04358003 A | * | 12/1992 | |
| JP | 5-83887 | | 4/1993 | |
| JP | 05308768 A | * | 11/1993 | |
| JP | 08172742 A | * | 7/1996 | |
| JP | 2002083709 A | * | 3/2002 | |
| JP | 2002-142389 | | 5/2002 | |
| JP | 2002-209370 | | 7/2002 | |
| JP | 2003297624 A | * | 10/2003 | |
| JP | 2004259807 A | * | 9/2004 | |
| TW | 449952 | | 8/2001 | |

* cited by examiner

*Primary Examiner*—Tran Nguyen
(74) *Attorney, Agent, or Firm*—Birch, Stewart, Kolasch & Birch, LLP

(57) ABSTRACT

A main body of a motor stator. The main body includes a cylindrical waist post, a plurality of first salients and a plurality of second salients. The waist post has a first end and a second end. The first salients, spaced at intervals, are connected to the first end and located on a first plane. The second salients, spaced at intervals, are connected to the second end and located on a second plane. When the first salients project onto the second plane along the axial direction of the cylindrical waist post, each projected first salient is located between two adjacent second salients.

27 Claims, 7 Drawing Sheets

«STATOR STRUCTURE AND MANUFACTURING METHOD THEREOF»

This Non-provisional application claims priority under 35 U.S.C. § 119(a) on Patent Application No(s). 092123387 filed in TAIWAN on Aug. 26, 2003, the entire contents of which are hereby incorporated by reference.

BACKGROUND

The present invention relates to a stator structure and in particular to a stator structure for a motor and manufacturing method thereof.

A conventional fan is shown in FIG. 1 including a rotor assembly 1, a stator 2 and a frame 3. The rotor assembly 1 includes a blade structure 11 having a hub 111 and blades 112 disposed around the exterior periphery of the hub 111. A metal case 12 and a magnet 13 are disposed in the hub 111 accordingly. A shaft 113 is disposed in the center of the hub 111 and a washer 14 is placed on the shaft 113. The stator 2 includes a housing 21, a coil 22, an upper insulation spacer 23, an upper pole plate 24, a lower insulation spacer 25, a lower pole plate 26 and a circuit board 27. The housing 21 is a hollow tube and has bearing system therein. The upper insulation spacer 23 and the upper pole plate 24 are placed sequentially on top of coil 22, encircling the outer periphery of the housing 21. Next, the lower insulation spacer 25, the lower pole plate 26 and the circuit board 27 are placed sequentially, encircling the outer periphery of housing 21. Thus, the top surface of the lower insulation spacer 25 contacts the lower end of coil 22. The shaft 113 of the rotor assembly 1 passing through the opening in housing 21 is locked by a ring 116 connecting the rotor assembly 1 and the stator 2. A sensor is further disposed on the circuit board 27 to detect and control the magnetic field of the stator 2. Finally, the bottom surface of the stator 2 is connected to the frame 3 completing the fan assembly. Obviously, assembly of the stator 2 is complicated.

Another conventional stator is shown in FIG. 2. The stator includes upper and lower poles 28, a magnetically conductive bushing 29 and a coil 22. Each end of the magnetically conductive bushing 29 is securely engaged to the hollow portion of each pole 28. An insulator (not shown) sheathes the magnetically conductive bushing 29, and the coil 22 is wound around the insulator. During assembly, teeth 281 on each upper and lower pole 28 are positioned complementary to each other in order that each of the teeth 281 is spaced equally.

Another conventional stator structure is disclosed in U.S. Pat. No. 5,859,487, disclosing a stator structure is integrally formed by a hollow cogged plate having four short salients and four long salients, both connected to a ring, and four long salients bent to complete the stator structure, further comprising four pieces of waist posts. This stator structure is utilized in thin silicon steel to accommodate the bending procedure. Therefore, a magnetically conductive path is easily saturated, and the salients are too small to function efficiently.

Assembly of the conventional stator is complicated, time consuming, and requires accurate assembly as the relative positions of the pole and sensor are prone to deviation which reduces motor efficiency. In order to eliminate required matching of the upper and lower pole layers, a simple and stable stator structure for improving motor efficiency is called for.

SUMMARY

An object of the present invention is to provide a stator structure for improving the efficiency of a motor. The stator structure of the present invention solves the above mentioned problem.

The stator structure of the present invention comprises a main body, an insulator, a coil, a circuit board and a stator bracket. The main body comprises a waist post having a first end and a second end; and a plurality of first salients spaced at intervals, connected to the first end, located on a first plane. A plurality of second salients spaced at intervals are connected to the second end and located on a second plane. When the first salients project onto the second plane along the axial direction of the waist post, each projected first salient is placed between two adjacent second salients. The waist post, the first and second salients are integrally formed. The insulator sheathes the waist post. The coil is wound around the insulator. The circuit board is positioned under the second salients. The stator bracket, engaged to the waist post secures the stator structure thereon.

The main body may be integrally formed by iron core powder, iron core powder surrounded by insulating epoxy resin or a magnetically conductive material.

The main body may be fabricated by pressing, hot pressing, compacting by centrifugal molding or injection molding.

The support of the stator bracket may be a plastic support or a metal support.

The cylindrical waist post may further have an opening. The opening may be circular, rectangular, polygonal or irregular-shaped.

The present invention further discloses a main body of a stator structure for improving the efficiency and mechanical accuracy of a motor. The main body includes a waist post, a plurality of first salients and a plurality of second salients. The waist post has a first end and a second end. The first salients, spaced at intervals, are connected to the first end and located on a first plane. The second salients, spaced at intervals, are connected to the second end and located on a second plane. When the first salients are projected onto the second plane along the axial direction of the waist post, each projected first salient is placed between two adjacent second salients. The waist post and the plurality of first and second salients may be integrally formed.

The first plane can be parallel to the second plane.

The first and second planes can be perpendicular to the axial direction of the waist post.

The waist post and the first and second salients may be integrally formed by iron core powder, iron core powder surrounded by insulating epoxy resin or a magnetically conductive material.

The cylindrical waist post and the plurality of the first and second salients may be fabricated by pressing, hot pressing, compacting by centrifugal molding or injection molding.

The cylindrical waist post may further have an opening. The opening may be circular, rectangular, polygonal or irregular-shaped.

The present invention further discloses a method for manufacturing a main body of a stator structure. The method comprises steps of providing metal powder and integrally forming a green compact from the metal powder. The green compact includes a cylindrical waist post, a plurality of first salients and a plurality of second salients. The cylindrical waist post has a first end and a second end. The first salients, spaced at intervals, are connected to the first end and located on a first plane. The second salients, spaced at intervals, are connected to the second end and located on a second plane. When the first salients are projected onto the second plane along the axial direction of the waist post, each projected first salient is placed between two adjacent second salients.

The method may further include a step of sintering the green compact to form a sintered body.

The method may further include sizing the sintered body.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention become more fully understood from the detailed description given hereinbelow and the accompanying drawings, which are given by way of illustration only, and thus are not limitative of the present invention, and wherein.

DETAILED DESCRIPTION

Figure 3A:
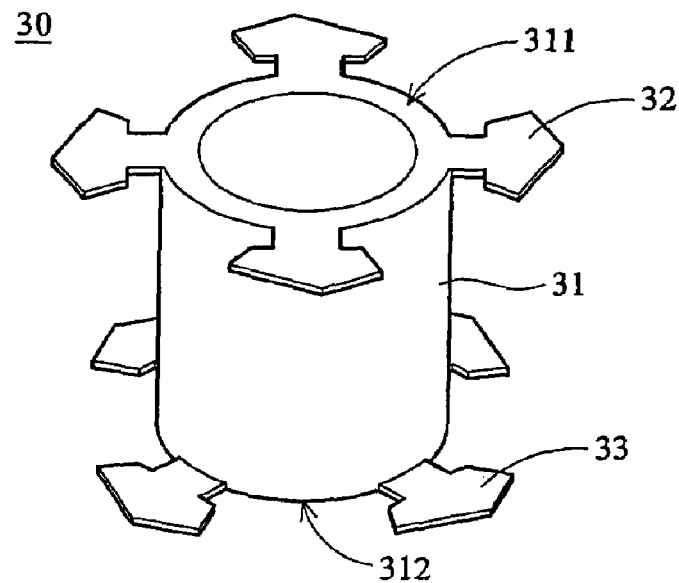
FIG. 3a is a schematic diagram of a main body of a stator structure in accordance with the present invention.
Figure 3B:
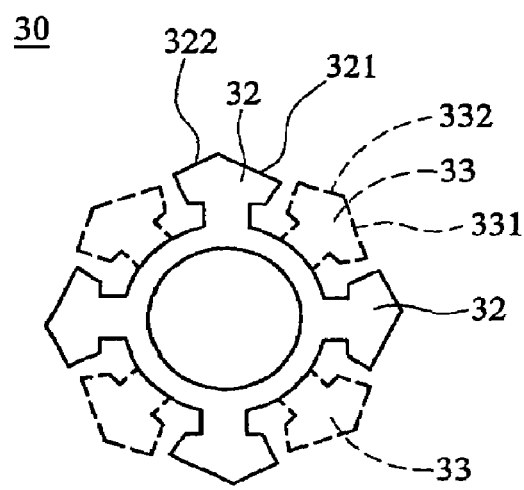
FIG. 3b is another view of the main body.

FIGS. 3a and 3b show a main body 30 of a stator structure in accordance with the present invention. The main body 30 includes a cylindrical waist post 31, a plurality of first salients 32 and a plurality of second salients 33. The cylindrical waist post 31 has a first end 311 and a second end 312. The first salients 32, spaced at intervals, are connected to the first end 311 and located on a first plane. The second salients 33, spaced at intervals, are connected to the second end 312 and located on a second plane. As shown in FIG. 3b, a top view of the main body 30, when the first salients 32 project onto the second plane along the axial direction of the cylindrical waist post 31, each projected first salient 32 is placed between two adjacent second salients 33. Each first salient 32 has a first straight side 321 and a second straight side 322. The first straight side 321 connects the second straight side 322 to form a first angle. Each second salient 33 has a third straight side 331 and a fourth straight side 332. The third straight side 331 connects the fourth straight side 332 to form a second angle. The first and second angles provide positioning function and improve starting performance. The first and second angles can be acute angles or obtuse angles.

Moreover, the cylindrical waist post 31, the plurality of first salients 32 and the plurality of second salients 33 are integrally formed to simplify the process. Furthermore, in this embodiment, the first plane is parallel to the second plane. The first and second planes are perpendicular to the axial direction of the waist post 31.

Figure 1:
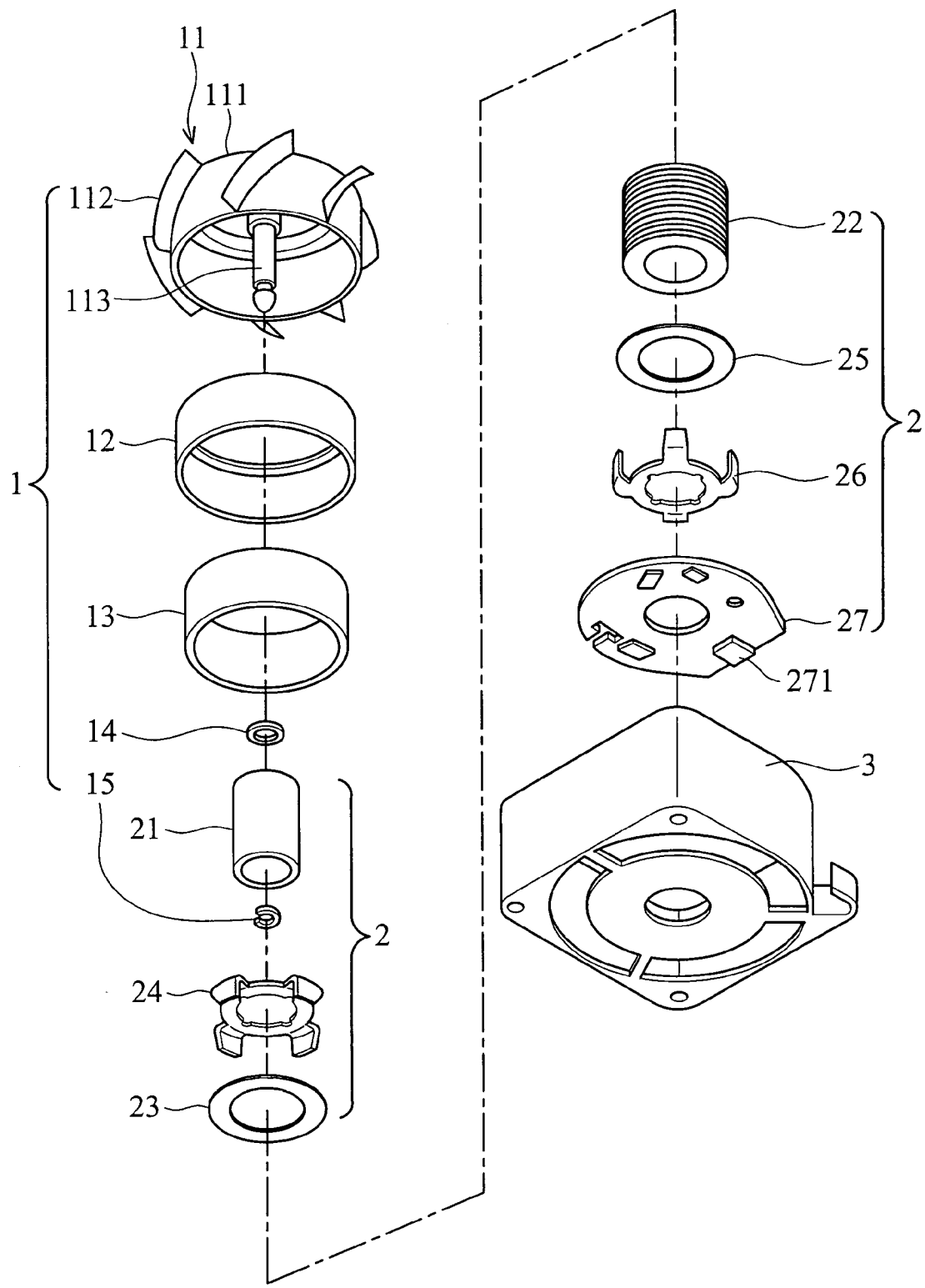
FIG. 1 is a schematic diagram of a conventional fan.
Figure 2:
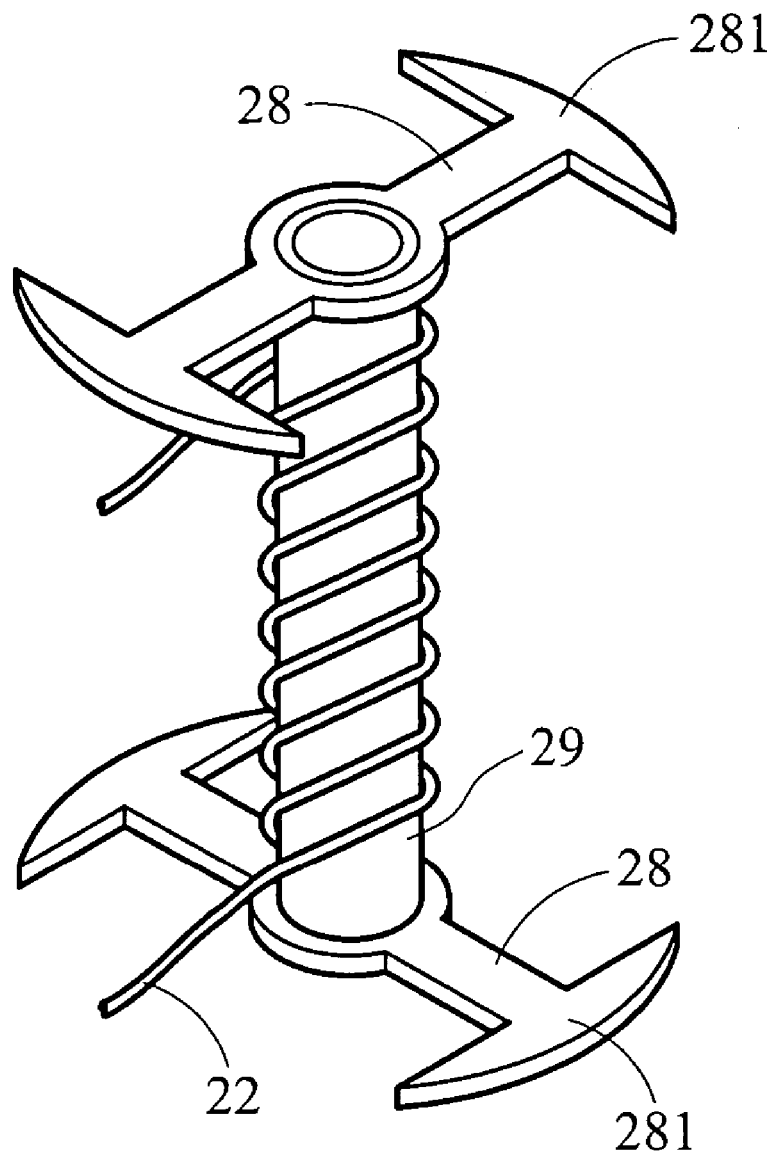
FIG. 2 is a schematic diagram of a conventional stator.
Figure 4:
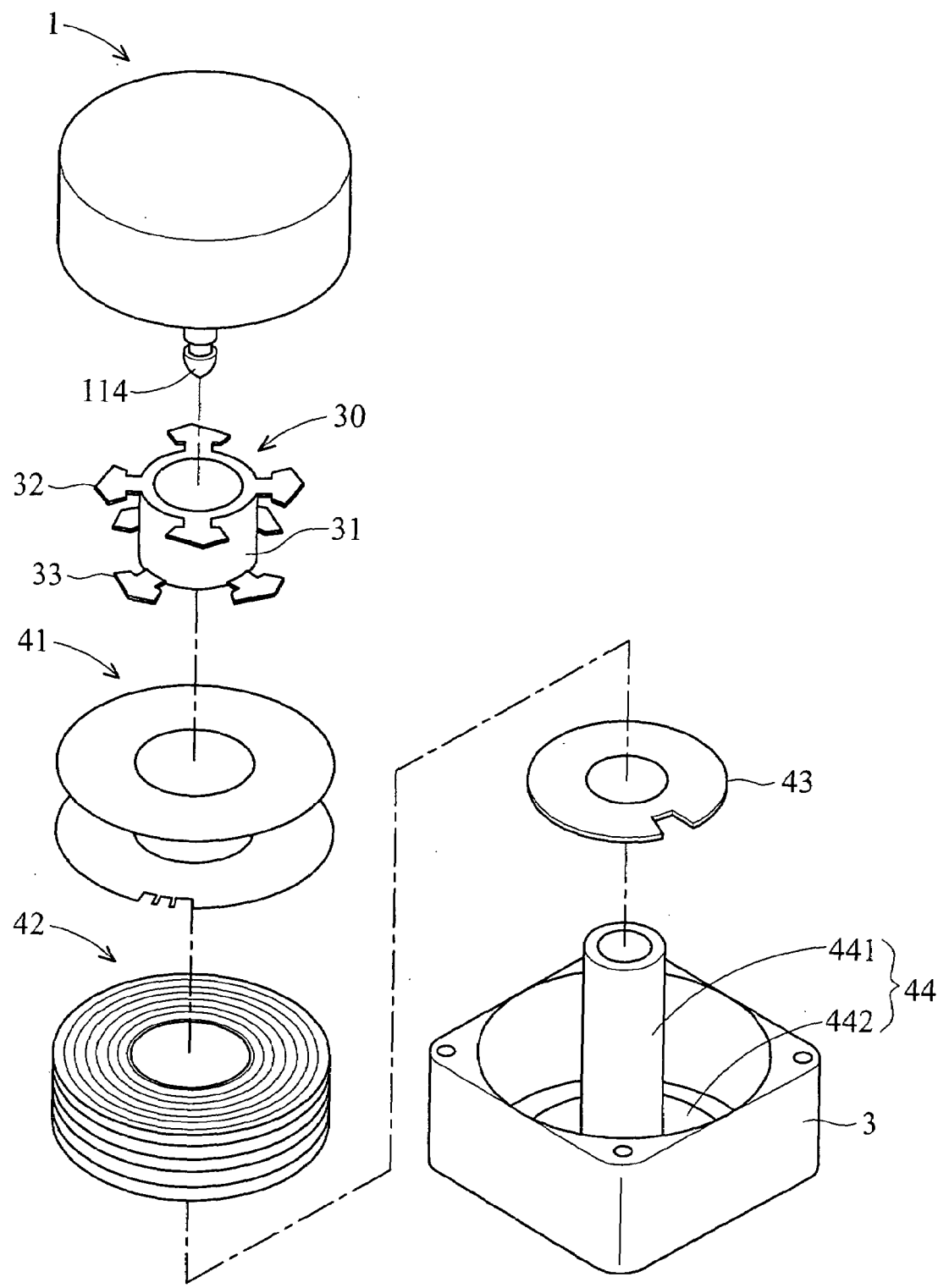
FIG. 4 is a schematic diagram of a stator structure of the present invention.

FIG. 4 shows a stator structure of the present invention. The stator structure includes a main body 30, an insulator 41, a coil 42, a circuit board 43 and a stator bracket 44. The main body 30 includes a cylindrical waist post 31, a plurality of first salients 32 and a plurality of second salients 33. The cylindrical waist post 31 has a first end and a second end. The first salients 32, spaced at intervals, are connected to the first end and located on a first plane. The second salients 33, spaced at intervals, are connected to the second end and located on a second plane. When the first salients 32 project onto the second plane along the axial direction of the cylindrical waist post 31, each projected first salient 32 is placed between two adjacent second salients 33. The insulator 41 disposed on the outer surface of the cylindrical waist post 31 is integrally formed by, for example, plastic injection molding with stator integrally. The coil 42 is wound around the insulator 41, and then the circuit board 43 is positioned under the second salients 33. A rotor (not shown) is connected to the stator structure and an electric circuit is formed on the circuit board 43. The electric circuit is utilized to detect the position of the rotor and control a magnetic field generated by the stator structure. The stator bracket 44 is then connected to the waist post 31, securing the stator structure thereon. The stator bracket 44 includes a support 442 and a housing 441 which protrudes from center of the support 442. The housing 441 passes through the circuit board 43 and the waist post 31 accordingly to complete the stator structure. Thereafter, the shaft 113 of the rotor 1 (shown in FIG. 1) passes through the cylinder post 441, engaging the frame 3 to form a motor. In this embodiment, the stator bracket 44 is already fastened to the frame 3.

Moreover, the insulator 41 is made of plastic. The support 442 of the stator bracket 44 is electrically insulated by, for example, plastic. Further, the support 442 may be a metal support. The housing 441 can be metal or plastic material.

The method for manufacturing a main body of a stator structure of the present invention is described in the following.

Figure 5:
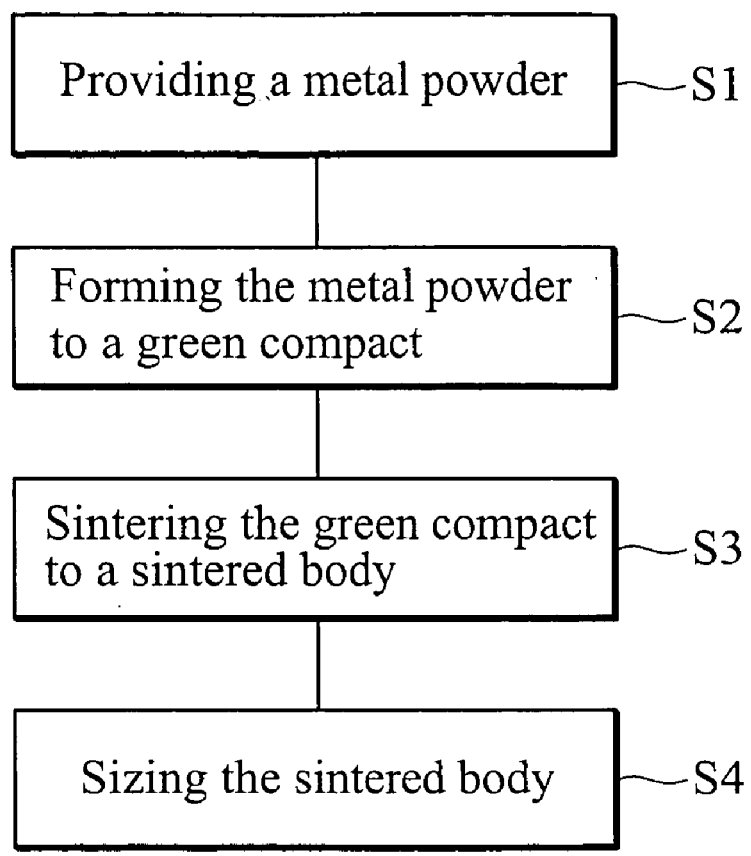
FIG. 5 is a flow chart of a method for forming a main body of a stator structure in accordance with the present invention.

In FIG. 5, the method for manufacturing a main body comprises providing a metal powder (S1) and integrally forming the metal powder into a green compact (S2).

In step S1, the metal powder is selected from the group consisting of an iron core powder, an iron core powder surrounded by insulating epoxy resin, a magnetically conductive material, and combinations thereof.

In step S2, the green compact serves as the main body of the present invention. More particularly, the green compact includes a cylindrical waist post, a plurality of first salients and a plurality of second salients. The cylindrical waist post has a first end and a second end. The first salients, spaced at intervals, are connected to the first end and located on a first plane. The second salients, spaced at intervals, are connected to the second end and located on a second plane. When the first salients project onto the second plane along the axial direction of the cylindrical waist post, each projected first salient is placed between two adjacent second salients.

Furthermore, the green compact is fabricated by pressing the metal powder.

Additionally, the green compact is fabricated by hot pressing the metal powder.

The green compact may also be fabricated by compacting the metal powder by centrifugal forming.

The green compact may also be fabricated by injection molding of the metal powder.

To further enhance strength of the main body of the stator structure, the method may further include a step S3 to sinter the green compact to a sintered body.

The method of the present invention can further include a step S4 of sizing the sintered body for imparting dimensional accuracy thereto.

Figure 6A:
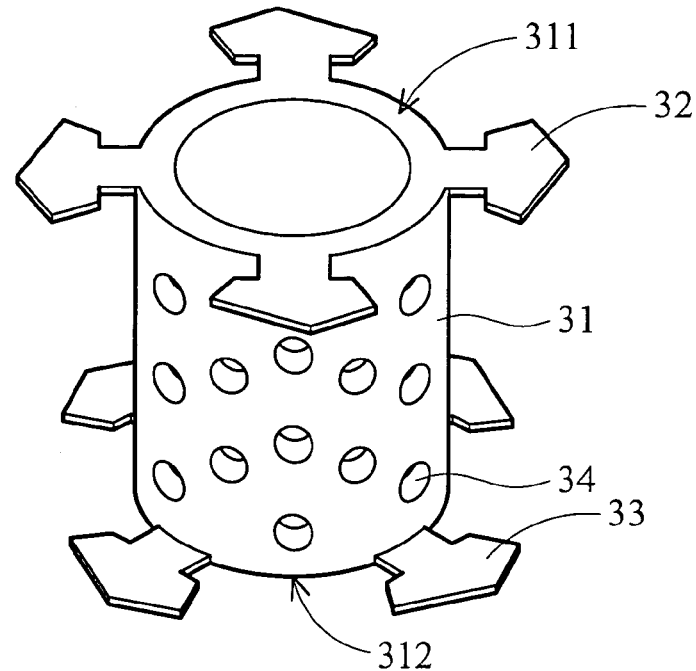
FIG. 6a is a schematic diagram of a main body of a stator structure in accordance with another embodiment of the present invention.
Figure 6B:
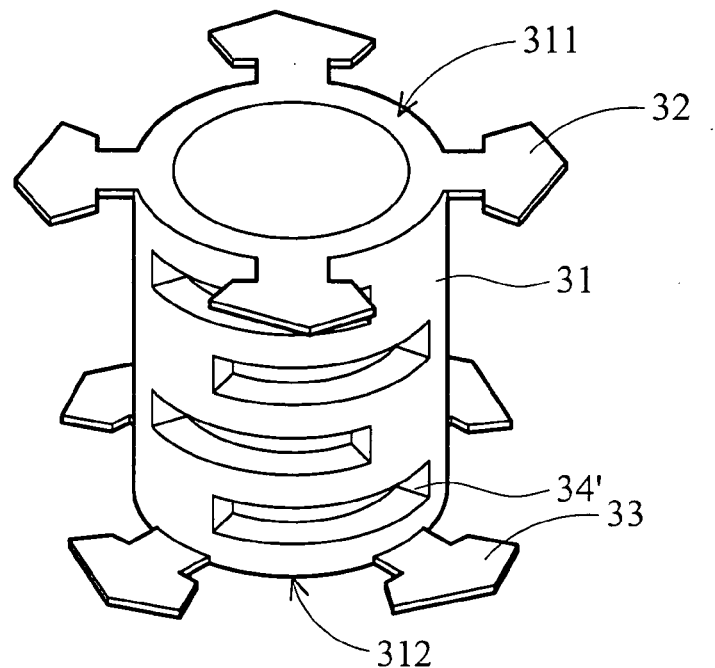
FIG. 6b is a schematic diagram of a main body of a stator structure in accordance with still another embodiment of the present invention.

Additionally, the cylindrical waist post mentioned above may further have openings 34, 34'. The openings 34, 34' may be circular, rectangular, polygonal or irregular-shaped as shown in FIGS. 6a and 6b.

Another method for manufacturing a main body of a stator structure of the present invention is described in the following.

Figure 7:
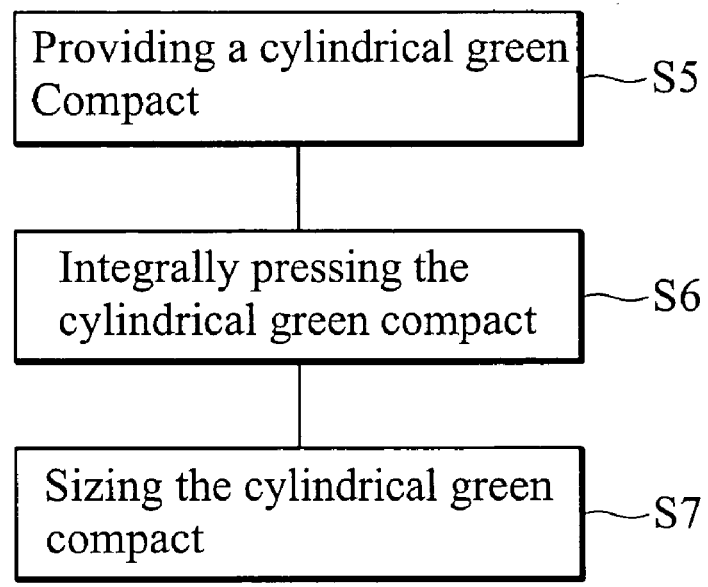
FIG. 7 is a flow chart of a method for forming a main body of a stator structure in accordance with another embodiment of the present invention.

In FIG. 7, the method for manufacturing a main body comprises providing a cylindrical green compact (S5) and integrally pressing the cylindrical green compact (S6).

In step S5, cylindrical green compact is integrally formed by iron core powder, iron core powder surrounded by insulating epoxy resin or a magnetically conductive material.

In step S6, integrally pressing the cylindrical green compact serves as the main body of the present invention. More particularly, the cylindrical green compact includes a waist post, a plurality of first salients and a plurality of second salients. The waist post has a first end and a second end. The first salients, spaced at intervals, are connected to the first end and located on a first plane. The second salients, spaced at intervals, are connected to the second end and located on a second plane. When the first salients project onto the second plane along the axial direction of the waist post, each projected first salient is placed between two adjacent second salients.

Furthermore, the cylindrical green compact is fabricated by pressing.

Additionally, the cylindrical green compact is fabricated by hot pressing.

The cylindrical green compact may also be fabricated by centrifugal forming.

The cylindrical green compact may also be fabricated by injection molding.

The method of the present invention can further include a step S7 of sizing the cylindrical green compact for imparting dimensional accuracy thereto.

In conclusion, the integral formation of the stator structure of the present invention ameliorates the disadvantages of the conventional stator. The present invention further prevents the magnetically conductive path from leaking, thus improving the efficiency of the motor.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A stator structure comprising:
   a main body comprising:
   a continuous-unity cylindrical waist post having a first end and a second end;
   a plurality of first salients spaced at intervals, connected to the first end and located on a first plane, wherein each first salient comprises a first straight side and a second straight side, the first straight side is larger than the second straight side, and the first straight side connects the second straight side to form a first angle; and
   a plurality of second salients spaced at intervals, connected to the second end and located on a second plane, wherein each second salient comprises a third straight side and a fourth straight side, the third straight side is larger than the fourth straight side, the third straight side connects the fourth straight side to form a second angle, each projected first salient is placed between two adjacent second salients when the first salients project onto the second plane along the axial direction of the continuous-unity cylindrical waist post, and the continuous-unity cylindrical waist post, and the first and second salients are a monolithic piece formed by pressing, hot pressing, centrifugal molding, or integrally pressing;
   an insulator disposed on the continuous-unity cylindrical waist post;
   a coil wound around the insulator;
   a circuit board positioned under the second salients; and
   a stator bracket connected to the continuous-unity cylindrical waist post for securing the stator structure thereon.

2. The stator structure as claimed in claim 1, wherein the insulator is a plastic insulator.

3. The stator structure as claimed in claim 1, wherein the main body is formed by a material selected from the group consisting of an iron core powder, an iron core powder surrounded by insulating epoxy resin, a magnetically conductive material, and combinations thereof.

4. The stator structure as claimed in claim 1, further comprising a rotor engaged to the stator structure and an electric circuit formed on the circuit board, wherein the electric circuit detects the position of the rotor and controls a magnetic field generated by the stator structure.

5. The stator structure as claimed in claim 1, wherein the stator bracket comprises a support and a cylinder post protruding from center of the support, and the cylinder post passes through the circuit board to engage the waist post.

6. The stator structure as claimed in claim 5, wherein the support of the stator bracket is electrically insulated.

7. The stator structure as claimed in claim 6, wherein the support is a plastic support or a metal support.

8. The stator structure as claimed in claim 1, wherein the continuous-unity cylindrical waist post further has an opening.

9. The stator structure as claimed in claim 8, wherein the opening is circular, rectangular, polygonal or irregular-shaped.

10. A main body of a motor stator, comprising:
    a continuous-unity cylindrical waist post having a first end and a second end;
    a plurality of first salients spaced at intervals, connected to the first end and located on a first plane, wherein each first salient comprises a first straight side and a second straight side, the first straight side is larger than the second straight side, and the first straight side connects the second straight side to form a first angle; and
    a plurality of second salients spaced at intervals, connected to the second end and located on a second plane, wherein each second salient comprises a third straight side and a fourth straight side, the third straight side is larger than the fourth straight side, the third straight side connects the fourth straight side to form a second angle, each projected first salient is placed between two adjacent second salients when the first salients project onto the second plane along the axial direction of the continuous-unity cylindrical waist post, and the continuous-unity cylindrical waist post, the plurality of first and second salients are a monolithic piece formed by pressing, hot pressing, centrifugal molding, or integrally pressing.

11. The main body as claimed in claim 10, wherein the first plane is parallel to the second plane.

12. The main body as claimed in claim 11, wherein the first and second planes are perpendicular to the axial direction of the continuous-unity cylindrical waist post.

13. The main body as claimed in claim 10, wherein the continuous-unity cylindrical waist post and the first and second salients are formed by a material selected from the group consisting of an iron core powder, an iron core powder surrounded by insulating epoxy resin, a magnetically conductive material, and combinations thereof.

14. The main body as claimed in claim 10, wherein the continuous-unity cylindrical waist post further has an opening.

15. The main body as claimed in claim 14, wherein the opening is circular, rectangular, polygonal or irregular-shaped.

16. A main body of motor stator, comprising:
   a continuous-unity cylindrical waist post having a first end and the second end;
   a plurality of first salients spaced at intervals, connected to the first end and located on a first plane, wherein each first salient comprises a first straight side and a second straight side, the first straight side is larger than the second straight side, and the first straight side connects the second straight side to form a first angle; and
   a plurality of second salients spaced at intervals, connected to the second end and located on a second plane, wherein each second salient comprises a third straight side and a fourth straight side, the third straight side is larger than the fourth straight side, the third straight side connects the fourth straight side to form a second angle, the first salients, the continuous cylindrical waist post, and the second salients are a monolithic piece formed by pressing, hot pressing, centrifugal molding, or integrally pressing.

17. The main body as claimed in claim 16, wherein the continuous-unity cylindrical waist post and the first and second salients are formed by a material selected from the group consisting of an iron core powder, an iron core powder surrounded by insulating epoxy resin, a magnetically conductive, and combinations thereof.

18. The main body as claimed in claim 16, wherein the first salients, the continuous cylindrical waist post, and the second salients are one-piece and are made from the same material.

19. The main body as claimed in claim 18, wherein the material of the first salients, the waist post and the second salients is a magnetic powder material.

20. The main body as claimed in claim 1, wherein the first salients, the continuous cylindrical waist post, and the second salients are one-piece and are made from the same material.

21. The main body as claimed in claim 20, wherein the material of the first salients, the waist post and the second salients is a magnetic powder material.

22. The main body as claimed in claim 10, wherein the first salients, the continuous cylindrical waist post, and the second salients are one-piece and are made from the same material.

23. The main body as claimed in claim 22, wherein the material of the first salients, the waist post and the second salients is a magnetic powder material.

24. A main body of motor stator, comprising:
   a continuous-unity cylindrical waist post having a first end and the second end;
   a plurality of first salients spaced at intervals, connected to the first end and located on a first plane, wherein each first salient comprises a first straight side and a second straight side, the first straight side is larger than the second straight side, and the first straight side connects the second straight side to form a first angle; and
   a plurality of second salients spaced at intervals, connected to the second end and located on a second plane, wherein each second salient comprises a third straight side and a fourth straight side, the third straight side is larger than the fourth straight side, the third straight side connects the fourth straight side to form a second angle, the first salients, the continuous cylindrical waist post, and the second salients are formed by a same material formed by pressing, hot pressing, centrifugal molding, or integrally pressing.

25. The main body as claimed in claim 24, wherein the material of the first salients, the waist post and the second salients is a magnetic powder.

26. The main body as claimed in claim 24, wherein the material of the continuous-unity cylindrical waist post and the first and second salients are selected from the group consisting of an iron core powder, an iron core powder surrounded by insulating epoxy resin, a magnetically conductive material, and combinations thereof.

27. The main body of claim 24, wherein each projected first salient is placed between two adjacent second salients when the first salients project onto the second plane along the axial direction of the continuous-unity cylindrical waist post, and the continuous-unity cylindrical waist post.

* * * * *